United States Patent [19]

Endo et al.

[11] Patent Number: 4,905,100
[45] Date of Patent: * Feb. 27, 1990

[54] MAGNETIC RECORDER/REPRODUCER

[75] Inventors: Kazuhito Endo; Masayuki Ishida; Yoshinobu Ishida, all of Nagaokakyo, Japan

[73] Assignee: Mitsubishi Denki Kabushiki Kaisha, Tokyo, Japan

[*] Notice: The portion of the term of this patent subsequent to Jun. 23, 2004 has been disclaimed.

[21] Appl. No.: 214,275

[22] Filed: Jun. 30, 1988

Related U.S. Application Data

[63] Continuation of Ser. No. 19,612, Feb. 27, 1987, Pat. No. 4,835,627, which is a continuation of Ser. No. 696,051, Jan. 29, 1985, Pat. No. 4,675,754.

[30] Foreign Application Priority Data

Feb. 21, 1984 [JP] Japan .................................. 59-32130
Mar. 16, 1984 [JP] Japan .................................. 59-51866
Mar. 30, 1984 [JP] Japan .................................. 59-64584

[51] Int. Cl.⁴ .............................................. G11B 5/09
[52] U.S. Cl. .................................... 260/32; 360/48
[58] Field of Search ..................... 360/32; 371/39, 40, 371/45, 2, 48

[56] References Cited

U.S. PATENT DOCUMENTS 4,211,997 7/1980 Rudnick .
4,224,642 9/1980 Mawatari et al. .
4,544,958 10/1985 Odaka .................................. 360/32

FOREIGN PATENT DOCUMENTS 58-185012 10/1983 Japan .
58-188314 11/1983 Japan .
58-153213 12/1983 Japan .
59-110012 6/1984 Japan .
59-140742 8/1984 Japan .
59-177706 10/1984 Japan .
60-93680 5/1985 Japan .
60-173774 9/1985 Japan .
58-166506 10/1988 Japan .
2061575 6/1980 United Kingdom .
2073935 10/1981 United Kingdom .

Primary Examiner—Vincent P. Canney
Attorney, Agent, or Firm—Lowe, Price, LeBlanc, Becker & Shur

[57] ABSTRACT

A magnetic recorder/reproducer converts two-channel analog signals into digital signals by a sample-and-hold-/A-D converter circuit (3) and controls addresses in a memory circuit (4) by a memory address control circuit (5), to distribute the digital signals into odd sample groups and even sample groups per each channel for arraying the odd sample groups and the even sample groups of the same channel in alternate scanning intervals, thereby to write the same in the memory circuit so that the odd samples and the even samples of the same channel are arrayed in positions separated from each other along the direction of scanning by rotary heads (10, 11). The digital signals thus permutated are modulated by a modulation circuit (7), to be recorded in a magnetic tape by the rotary heads. The digital signals reproduced by the rotary heads are demodulated by a demodulation circuit (14), to be stored in a memory circuit (15). A memory address control circuit (16) controls addresses so as to permutate samples of the reproduced digital signals stored in the memory circuit to be in the original array thereof. The reproduced digital signals read from the memory circuit are converted into analog signals by a D-A converter (18), to be outputted through a low-pass filter (19).

62 Claims, 8 Drawing Sheets

| | L CHANNEL(A) | | | | R CHANNEL(B) | | | | R CHANNEL(B) | | | | L CHANNEL(A) | | | |
|---|---|---|---|---|---|---|---|---|---|---|---|---|---|---|---|---|
| | 0 | 1 | 2 | 3 | 4 | 5 | 6 | 7 | 8 | 9 | 10 | 11 | 12 | 13 | 14 | 15 |
| 0 | $W_{L0}$ | $W_{L2}$ | $W_{L4}$ | $W_{L6}$ | $W_{R1}$ | $W_{R3}$ | $W_{R5}$ | $W_{R7}$ | $W_{R0}$ | $W_{R2}$ | $W_{R4}$ | $W_{R6}$ | $W_{L1}$ | $W_{L3}$ | $W_{L5}$ | $W_{L7}$ |
| 1 | $W_{L8}$ | $W_{L10}$ | $W_{L12}$ | $W_{L14}$ | $W_{R9}$ | $W_{R11}$ | $W_{R13}$ | $W_{R15}$ | $W_{R8}$ | $W_{R10}$ | $W_{R12}$ | $W_{R14}$ | $W_{L9}$ | $W_{L11}$ | $W_{L13}$ | $W_{L15}$ |
| 2 | $W_{L16}$ | $W_{L18}$ | $W_{L20}$ | $W_{L22}$ | $W_{R17}$ | $W_{R19}$ | $W_{R21}$ | $W_{R23}$ | $W_{R16}$ | $W_{R18}$ | $W_{R20}$ | $W_{R22}$ | $W_{L17}$ | $W_{L19}$ | $W_{L21}$ | $W_{L23}$ |
| 3 | $W_{L24}$ | $W_{L26}$ | $W_{L28}$ | $W_{L30}$ | $W_{R25}$ | $W_{R27}$ | $W_{R29}$ | $W_{R31}$ | $W_{R24}$ | $W_{R26}$ | $W_{R28}$ | $W_{R30}$ | $W_{L25}$ | $W_{L27}$ | $W_{L29}$ | $W_{L31}$ |
| 4 | $c_{L0}$ | $c_{L2}$ | $c_{L4}$ | $c_{L6}$ | $c_{R1}$ | $c_{R3}$ | $c_{R5}$ | $c_{R7}$ | $c_{R0}$ | $c_{R2}$ | $c_{R4}$ | $c_{R6}$ | $c_{L1}$ | $c_{L3}$ | $c_{L5}$ | $c_{L7}$ |
| | $\ell_{L0}$ | $\ell_{L2}$ | $\ell_{L4}$ | $\ell_{L6}$ | $\ell_{R1}$ | $\ell_{R3}$ | $\ell_{R5}$ | $\ell_{R7}$ | $\ell_{R0}$ | $\ell_{R2}$ | $\ell_{R4}$ | $\ell_{R6}$ | $\ell_{L1}$ | $\ell_{L3}$ | $\ell_{L5}$ | $\ell_{L7}$ |

← 1 FRAME LENGTH →

← 2 SCAN →

MAGNETIC RECORDER/REPRODUCER

This is a continuation of application Ser. No. 07/019,612, now U.S. Pat. No. 4,835,627, which is a continuation of application Ser. No. 06/696,051, filed 1-29-85 now U.S. Pat. No. 4,675,754.

BACKGROUND OF THE INVENTION

1. Field of the Invention

The present invention relates to a magnetic recorder/reproducer. More specifically, it relates to a magnetic recorder/reproducer having rotary heads which converts analog signals into digital signals for slantingly or vertically scanning the same by the rotary heads thereby recording the digital signals in a magnetic tape and reproducing the same, and particularly to an improvement in interleaving of the data thereof.

2. Description of the Prior Art

Heretofore well known in the art is a rotary head-type PCM magnetic recorder/reproducer which converts audio signals into digital signals for recording the digital signals in a magnetic tape and reproducing the recorded digital signals. In general, a rotary head-type PCM magnetic recorder/reproducer employs error correction codes for correcting errors caused in the data upon recording/reproducing of the magnetic tape.

The error correction codes are adapted to correct the errors caused in the data following recording/reproducing of the magnetic tape thereby to reproduce high difinition audio signals. However, when the number of the errors is beyond the correction ability to disable the error correction, compensation must be performed by means such as interpolation by taking the mean value of adjacent data. Further, most of the errors caused on the magnetic tape are burst errors, and hence the erroneous data are dispersed by interleaving processing for improving the ability of the error correction codes.

As hereinabove described, compensation processing is performed when the errors cannot be corrected, and mean value interpolation is employed as an effective compensation process with simple circuit structure. Such mean value interpolation is performed on condition that the adjacent data are correct.

Therefore, data of odd sample groups are separated as far as possible from those of even sample groups when the interleaving operation is performed.

Figure 1:
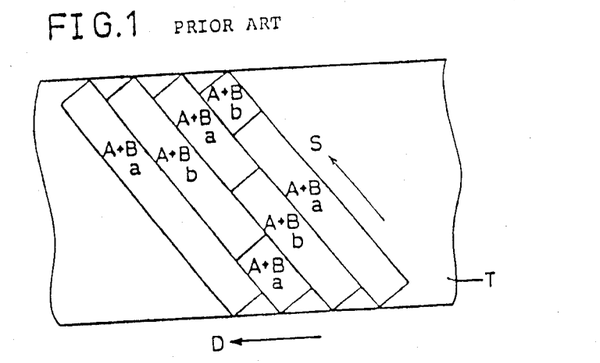
FIGS. 1 and 2 are illustrations showing conventional magnetization patterns.
Figure 2:
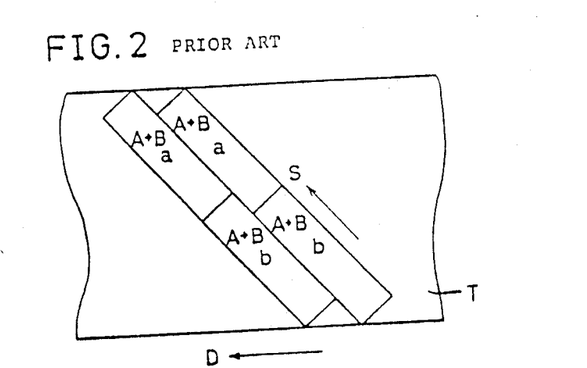

FIGS. 1 and 2 show magnetization patterns recorded on a magnetic tape by a conventional rotary head-type PCM magnetic recorder/reproducer.

The following description is made on a rotary head-type PCM magnetic recorder/reproducer of a two-head helical scanning system, which is taken as a typical example.

In FIGS. 1 and 2, a magnetic tape T travels in the direction indicated by an arrow D and is scanned by rotary heads in the direction indicated by an arrow S. The data recorded in the magnetic tape T are of two channels A and B, and distributed into even sample groups a and odd sample groups b. For example, symbol a with symbol A+B indicates even sample groups of the channels A and B, and symbol Aa indicates an even sample group of the channel A.

The volume of interleaving is generally determined in consideration of burst length of errors and correction ability of error correction codes, and an even sample group a and an odd sample group b may be in line over a scanning interval as shown in FIG. 1 or to the contrary.

FIG. 2 shows the even sample groups a and the odd sample groups b arrayed in equally divided scanning intervals. In the interleaving operation performed in this manner, errors are caused in continuous data when one of the rotary heads is instantaneously silted by magnetic powder coming off from the magnetic tape T, i.e., when the reproduced signals from one of the rotary heads are interrupted. Thus, it has been impossible to perform the mean value interpolation, which causes harsh noise.

SUMMARY OF THE INVENTION

Accordingly, an essential object of the present invention is to porvide a magnetic recorder/reproducer which can reduce noise caused by a silted rotary head and by errors in the tape travelling direction over a certain width along the cross direction of a magnetic tape.

In an aspect, the present invention provides a magnetic recorder/reproducer which performs coding operation so that error correction codes are completed in one scanning interval and effectively reproduces signals even if a rotary head is silted or a burst error is caused in the tape travelling direction over a certain width, thereby to prevent increase in the clock rate required for error correction.

In summary, the present invention converts analog signals of a plurality of channels into digital signals to distribute the digital signals of the plurality of channels into odd sample groups and even sample groups per each channel, and permutates the sample groups so that the odd sample groups and the even sample groups of the same channel are recorded in alternate scanning intervals in positions separated along the direction of scanning thereby to record the permutated odd sample groups and the even sample groups of the respective channels in a magnetic recording medium by magnetic heads.

Therefore, according to the present invention, the signals may be readily corrected even if reproduced signals from one head are interrupted by, e.g., instantaneous silting of the head caused by magnetic powder coming off from the magnetic tape or a burst error is caused in the tape travelling direction over a wide range along the cross direction of the tape, whereby the signal-to-noise ratio of reproduced sounds or images can be improved. Further, excellent reproduced sounds and images can be obtained by properly selecting samples from the respective groups.

In a preferred embodiment of the present invention, even sample groups of a first channel and odd samples group of a second channel are arrayed in the same scanning intervals while odd sample groups of the first channel and even sample groups of the second channel are arrayed in scanning intervals adjacent to the said same scanning intervals, such that the odd sample groups and the even sample groups of the first channel are recorded in positions separated from each other along the direction of scanning. Or, the even sample groups of the first channel and the even sample groups of the second channel may be arrayed in the same scanning intervals while the odd sample groups of the first channel and the odd sample groups of the second channel are arrayed in scanning intervals adjacent to the said same scanning intervals in such a manner that the odd sample groups and the even sample groups of the first channel are recorded in positions separated along the direction of scanning.

In a second aspect of the present invention, the respective sample groups recorded in the magnetic tape in the aforementioned manner are reproduced by magnetic heads to be permutated in order of sample numbers per each channel and outputted to be converted into analog signals.

In a third aspect of the present invention, the permutated odd sample group and even sample group of each channel in each scanning interval are encoded to generate error correction codes, which are arrayed in the scanning interval including information employed for generating the error correction codes to be recorded.

Therefore, according to the present invention, the error correction codes are so generated and arrayed as to be completed with respect to the data included in one scanning interval, thereby to prevent increase in the clock rate required for encoding and decoding of the data.

The above and other objects, features, aspects and advantages of the present invention will become more apparent from the following detailed description of the present invention when taken in conjunction with the accompanying drawings.

DESCRIPTION OF THE PREFERRED EMBODIMENTS

Figure 3:
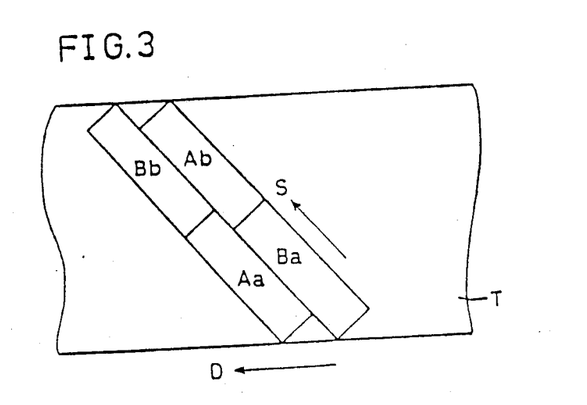
FIGS. 3 and 4 are illustrations showing magnetization patterns according to an embodiment of the present invention.

FIG. 3 is an illustration showing a magnetization pattern recorded on a magnetic tape in an embodiment of the present invention. The principle of the present invention is now described with reference to FIG. 3. In a rotary head-type magnetic recorder/reproducer according to the present invention, interleaving processing is characterized in that even sample groups and odd sample groups of the same channel are arrayed in alternate scanning intervals in positions separated from each other along the direction of scanning by rotary heads. By virtue of such array, at least either the even sample groups or the odd sample groups of the same channel can necessarily be obtained even if signals in one of two rotary heads are interrupted by the aforementioned silting, and hence no continuous sample errors are caused. Further, with respect to a burst error caused along the tape travelling direction in a certain width from the edge of the magnetic tape, either the even sample groups or the odd sample groups of the same channel can be obtained to half the width of the magnetic tape in the cross direction as shown in FIG. 3, whereby no continuous sample errors are caused in the same channel.

Figure 4:
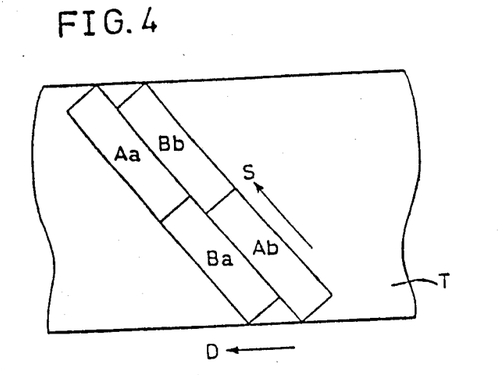

FIG. 4 is an illustration showing another example of the magnetization pattern. Also in the example as shown in FIG. 4, even sample groups and odd sample groups of the same channel are arrayed in alternate scanning intervals in positions separated from each other along the direction of scanning, and hence no sample errors are caused by interruption of signals similarly to the example as shown in FIG. 3.

Figure 5:
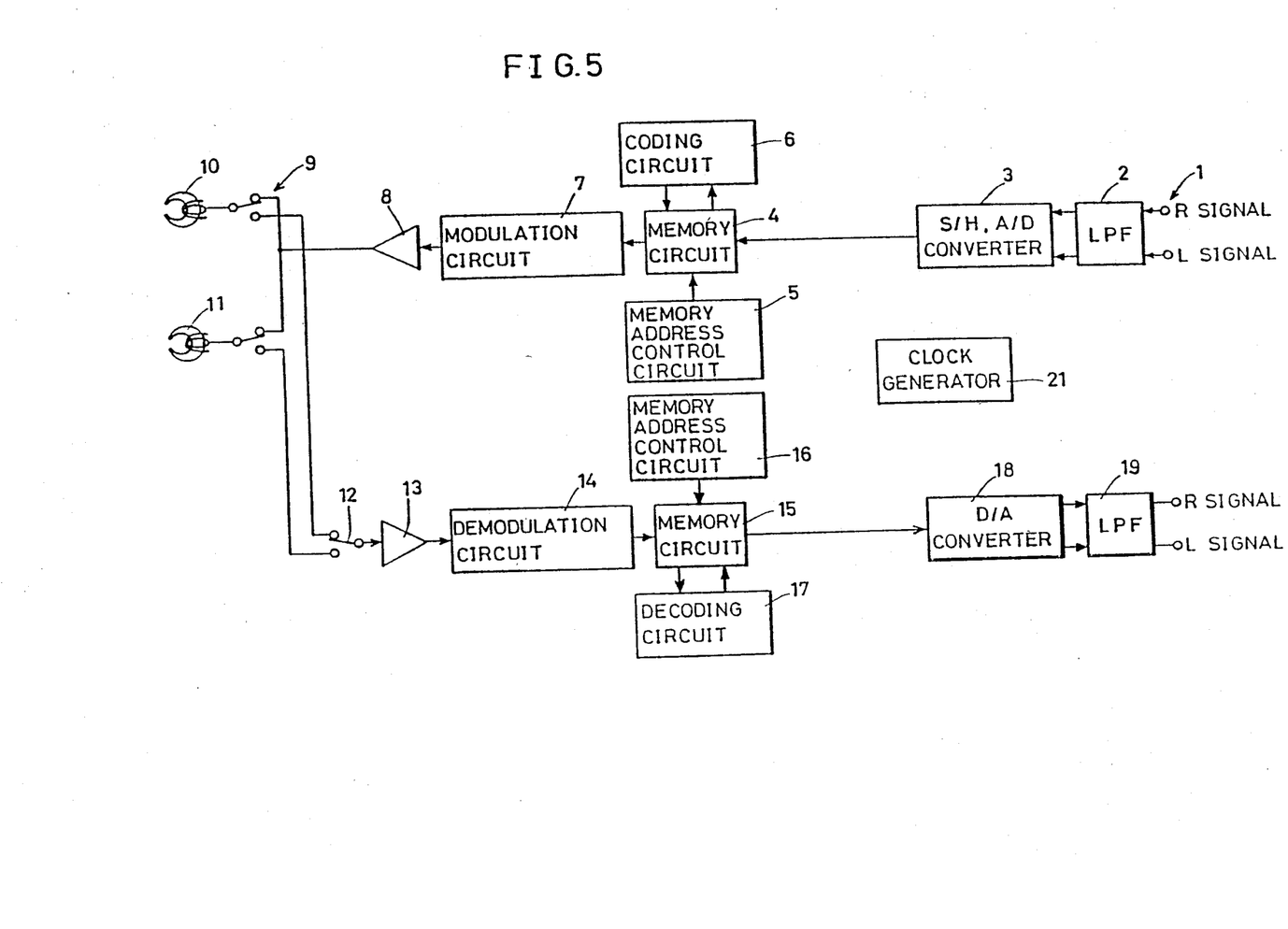
FIG. 5 is a roughly illustrated block diagram showing an embodiment of the present invention.
Figure 6:
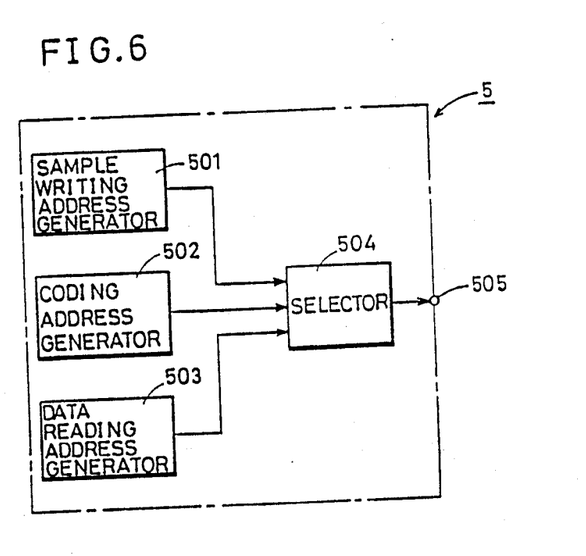
FIG. 6 is a roughly illustrated block diagram showing a memory address control circuit as shown in FIG. 5.

FIG. 5 is a roughly illustrated block diagram showing an embodiment of the present invention and FIG. 6 is a roughly illustrated block diagram showing a memory address control circuit as shown in FIG. 5.

Description is now made on structure of the present embodiment with reference to FIGS. 5 and 6. A rotary head-type PCM magnetic recorder/reproducer consists of a recording system and a reproducing system. A two-channel input terminal 1 of the recording system receives analog audio signals. The analog audio signals inputted in the input terminal 1 are supplied to a low-pass filter 2 to be band-restricted. Then the analog audio signals passed through the low-pass filter 2 are inputted in a sample-and-hold/A-D converter circuit 3. The sample-and-hold/A-D converter circuit 3 converts the analog audio signals into digital signals. The digitally converted signals are supplied to a memory circuit 4 to be stored therein. The memory circuit 4 is address-controlled by a memory address control circuit 5.

As shown in FIG. 6, the memory address control circuit 5 is formed by a sample writing address generator circuit 501, a coding address generator circuit 502, a data reading address generator circuit 503 and a selector 504 which receives respective outputs from the sample writing address generator circuit 501, the coding address generator circuit 502 and the data reading address generator circuit 503 for making selective outputs at an address output terminal 505. A coding circuit 6 is provided in relation to the memory circuit 4. The coding circuit 6 generates codes for correcting and detecting errors in the digital signals stored in the memory circuit 4. The digital signals read from the memory circuit 4 are supplied to a modulation circuit 7 to be modulated by the same. The modulated digital signals are amplified by a recording amplifier 8, to be supplied to either a rotary head 10 or 11 which is selected by a first selection switch 9.

The digital signals reproduced by the rotary heads 10 and 11 are inputted through a second selection switch 12 for selecting the rotary head 10 or 11 in a reproducing amplifier 13. The reproducing amplifier 13 amplifies the reproduced digital signals to supply the same to a demodulation circuit 14. The demodulation circuit 14 demodulates the reproduced digital signals, to supply the demodulated outputs to a memory circuit 15. The memory circuit 15 is connected with a memory address control circuit 16, which controls addresses of the memory circuit 15. The memory circuit 15 is further connected with a decoding circuit 17. The decoding circuit 17 is adapted to correct and detect errors in the reproduced digital signals. The reproduced digital signals read from the memory circuit 15 are supplied to a D-A converter circuit 18, to be converted into analog signals. The converted analog signals are outputted at an output terminal 20 through a low-pass filter 19.

Operation in the recording system is now described. The input terminal 1 receives analog audio signals of left and right channels, which are respectively band-restricted by the low-pass filter 2. The outputs from the low-pass filter 2 are supplied to the sample-and-hold/A-D converter circuit 3, to be converted into digital signals $W_{Ln}$ and $W_{Rn}$. Symbol n represents order of sampling, and the analog signals of the left and right channels are subsequently sampled to be alternately outputted as digital signals $W_{L0}$, $W_{R0}$, $W_{L1}$, $W_{R1}$, $W_{L2}$, $W_{R2}$, .... The digital signals $W_{Ln}$ and $W_{Rn}$ are supplied to the memory circuit 4 to be subsequently written in the same with memory addresses being controlled by the sample writing address generator circuit 501 of the address control circuit 5 provided in relation to the memory circuit 4. The address control operation is hereinafter described in detail.

The coding circuit 6 provided in relation to the memory circuit 4 reads necessary samples included in the digital signals stored in the memory circuit 4 for generating error correction codes and again writing the same in the memory circuit 4. The digital signals and the error correction codes are subsequently read by the address control circuit 5. The read digital signals are inputted in the demodulation circuit 7, to be converted into signals appropriate for recording in the magnetic tape. The converted signals are amplified by the recording amplifier 8, to be recorded in the magnetic tape by the two rotary heads 10 and 11 through the first selection switch 9. The first selection switch 9 is adapted to switch the circuits to be connected with the rotary heads 10 and 11 in recording and reproducing of the signals.

Operation in the reproducing system is now described. The reproduced digital signals read from the two rotary heads 10 and 11 are supplied to the second selection switch 12 through the first selection switch 9. The second selection switch 12 is adapted to supply the signals read from the rotary heads 10 and 11 to the reproducing amplifier 13 as single-system signals. The reproduced digital signals are amplified by the reproducing amplifier 13, to be supplied to the demodulation circuit 14. The demodulation circuit 14 demodulates the reproduced digital signals to those before modulation, to supply the same to the memory circuit 15. The memory circuit 15 is address-controlled by the memory address control circuit 16, to write the reproduced digital signals. The decoding circuit 17 provided in relation to the memory circuit 15 reads necessary samples from the memory circuit 15 to correct and detect errors. The corrected samples in the memory circuit 15 are subsequently read therefrom by the memory address control circuit 16, to be supplied to the D-A converter circuit 18. The D-A converter circuit 18 converts the digital signals into analog signals, to supply the same to the low-pass filter 19. The low-pass filter 19 performs band restriction of the analog signals, to output the same from the output teminal 20.

A clock generator circuit 21 is adapted to generate clock pulses required for the respective components of the recording and reproducing systems.

In relation to the memory circuits 4 and 15 as shown in FIG. 5, description is now made on means for performing the aforementioned data interleaving operation employed in the rotary head-type PCM magnetic recorder/reproducer according to the present invention.

Figure 7:
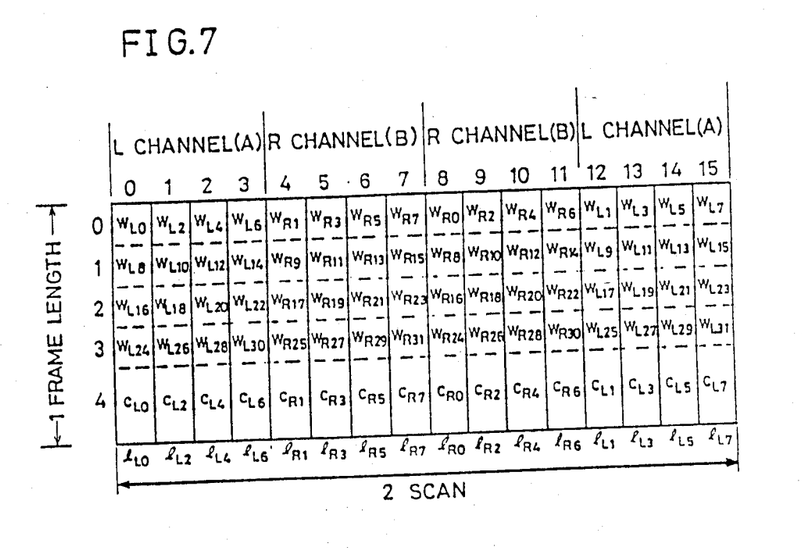
FIG. 7 is an illustration showing respective sample groups stored in a memory circuit as shown in FIG. 5.

FIG. 7 is an illustration showing an example of samples stored in the memory circuit as shown in FIG. 5. In FIG. 7, the magnetic heads 10 and 11 respectively record 32 samples in the left and right channels respectively during an interval for scanning the magnetic tape. Numerals in the lateral direction indicate column unit memory addresses (hereinafter referred to as "frame addresses") and numerals in the vertical direction indicate row unit memory addresses (hereinafter referred to as "sample addresses").

In the recording system, the A-D converted and subsequently supplied samples $W_{L0}$, $W_{R0}$, $W_{L1}$, $W_{R1}$, ... are written in the memory circuit 4 with addresses controlled by the address control circuit 5 to be in the array as shown in FIG. 6. In other words, the samples are subsequently written in the memory circuit 4 with sample address being set at 0 and the frame address being set at 0, 8, 12, 4, .... When the frame address comes to 7 and the sample $W_{R7}$ is written in the memory circuit 4, the sample address is updated by 1 so that a given number of samples are written in the memory circuit 4 with the frame addresses being again controlled. The samples are thus arrayed in the form of a matrix of 4×16, while even sample groups and odd sample groups of the respective channels are already separated from each other. With respect to the sample matrix thus formed, the coding circuit 6 as shown in FIG. 5 performs encoding of the samples read by the coding address generator circuit 502 of the memory address control circuit 5, whereas explanation of such encoding operation is omitted since the same is not the substance of the present invention. It is to be noted that codes $C_{Ln}$ and $C_{Rn}$ are utilized as error correction codes in the unit of frames.

The data reading address generator circuit 503 of the memory address control circuit 5 subsqently reads the samples from the memory circuit 4 in the unit of frames with vertical four samples and one error correction word processed as one frame. In other words, the memory address control circuit 5 sets the frame address at 0 and subsequently updates the sample address as 0, 1, 2, ..., and when an error correction word is read at the sample address of 4, it updates the frame address by 1 to read the samples. The data to the frame address of 7 are arrayed in one scanning interval, and scanning of the whole data in the memory circuit 4 is completed by performing operation for two scanning intervals.

Figure 8:
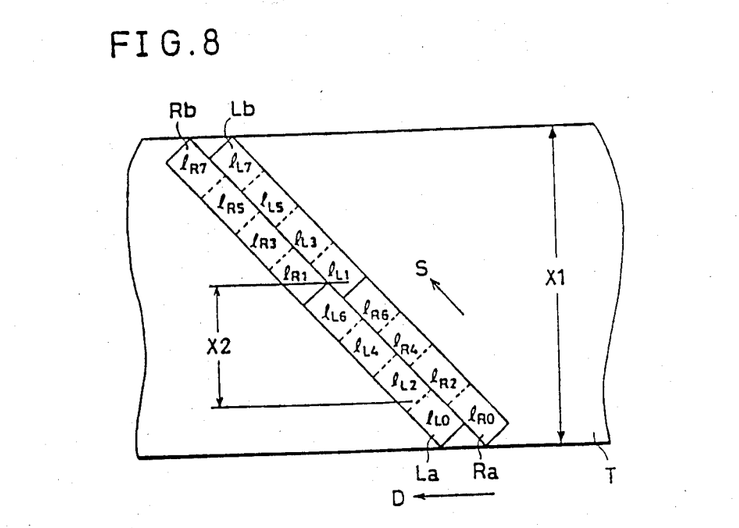
FIG. 8 illustrates a magnetization pattern showing frame array recorded in the memory circuit as shown in FIG. 7.

The data thus read from the memory circuit 4 are in the magnetization pattern as shown in FIG. 8 on the magnetic tape, and are arrayed as shown in FIG. 3. In the signals recorded in the aforementioned manner, no continuous error takes place even if a burst error is caused by interruption of signals in one scanning interval or in the tape travelling direction in half the width of the magnetic tape from the edge thereof, and hence compensation by mean value interpolation is enabled.

The aforementioned operation for controlling the addresses in writing of the samples in the memory circuit 4 may appropriately be changed for obtaining the magnetization pattern as shown in FIG. 4.

As hereinabove described, the present embodiment is characterized in that even samples and odd samples are permutated in the unit of groups and that the samples in the respective groups are recorded in positions separated from those in continuity therewith along the direction of scanning as shown in FIG. 8. For example, with respect to a frame $1_{L2}$ including a sample $W_{L2}$, frames $1_{L1}$ and $1_{L3}$ including data $W_{L1}$ and $W_{L3}$ which are in continuity with the sample $W_{L2}$ are arrayed in positions separated from the frame $1_{L2}$ along the tape travelling direction in FIG. 8. More specifically, the data $W_{L2}$ and $W_{L1}$ are separated from each other by a distance $X_2$, and no continuous sample error is caused to a burst error in the tape travelling direction in a width smaller than the length $X_2$.

Assuming that $\alpha$ frames are recorded in one scanning interval, the distance $X_2$ is found as follows:

$$X_2 = (\alpha/2 - 1)X_1/\alpha$$

In practice, 200 to 300 frames are generally recorded in one scanning interval, and hence $X_2 \simeq X_1/2$, and hence no continuous sample error takes place even if an error is caused in the tape travelling direction in about half the width of the magnetic tape. Further, as hereinabove described, no continuous sample error takes place by signal interruption caused in one scanning interval, and hence compensation by mean value interpolation is enabled.

Figure 9:
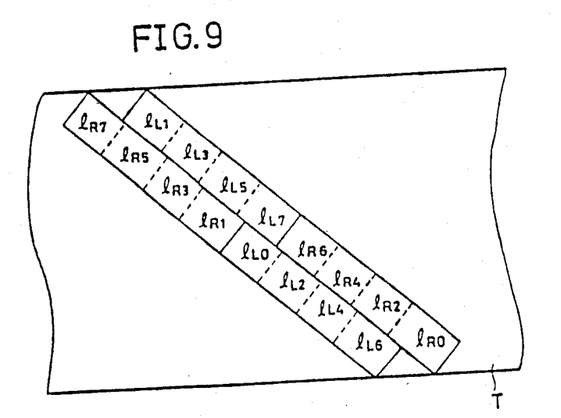
FIG. 9 is an illustration showing a magnetization pattern according to another embodiment of the present invention.

FIG. 9 is an illustration showing another example of the sample array. Although frame arrangement of the right channel in the sample array as shown in FIG. 9 is different in order from that shown in FIG. 7, a similar effect can be obtained also by such array as the matter of course. The magnetization pattern as shown in FIG. 9 can be implemented by simply changing the address control circuits 5 and 16 as shown in FIG. 5.

Figure 10:
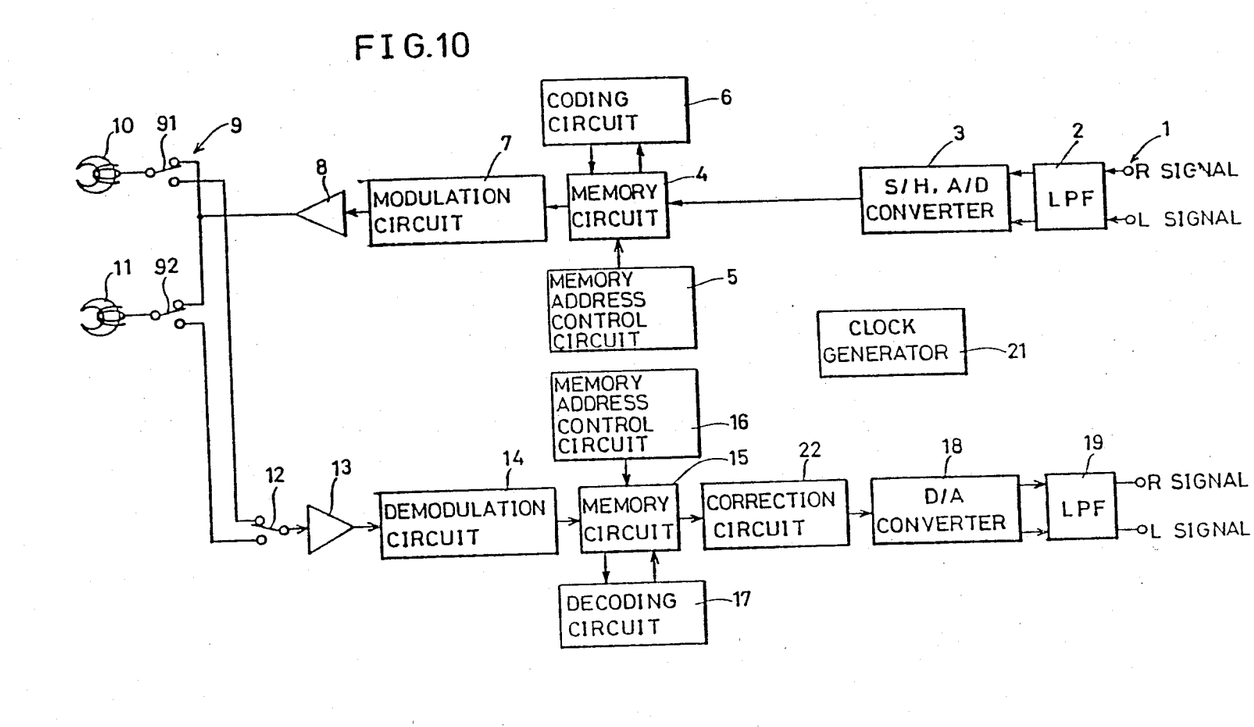
FIG. 10 is a roughly illustrated block diagram showing another embodiment of the present invention.
Figure 11:
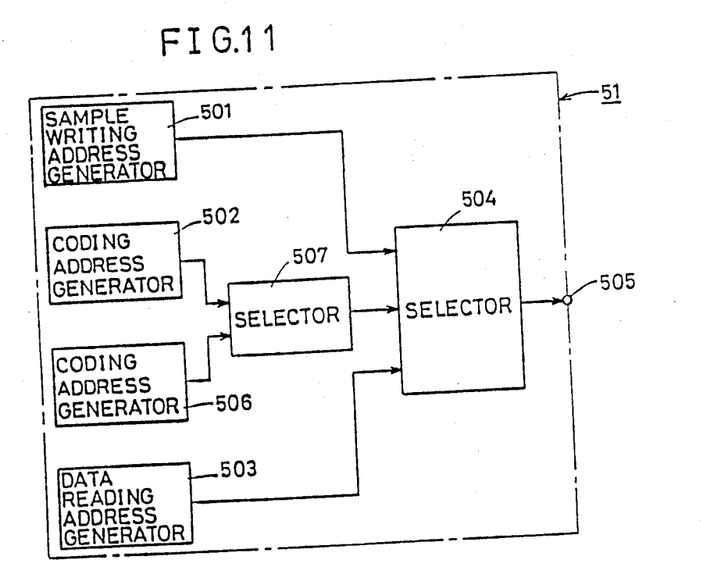
FIG. 11 is a roughly illustrated block diagram showing a memory address control circuit as shown in FIG. 10.

FIG. 10 is a roughly illustrated block diagram showing another embodiment of the present invention, and FIG. 11 is a roughly illustrated block diagram of a memory address control circuit as shown in FIG. 10. A rotary head-type PCM magnetic recorder/reproducer as shown in FIG. 10 is substantially identical to that shown in FIG. 5 except for that a correction circuit 22 is provided between a memory circuit 15 and a D-A converter circuit 18 of the reproducing system and a memory address control circuit 51 is structured as shown in FIG. 11. The correction circuit 22 is adapted to perform correction by the aforementioned mean value interpolation of samples not corrected though errors are detected.

The memory address control circuit 51 comprises a sample writing address generator circuit 501, a first coding address generator circuit 502, a data reading address generator circuit 503, a second coding address generator circuit 506, a second selector 507 for receiving and selectively outputting the outputs from the first and second coding address generator circuits 502 and 506 and a first selector 504 for receiving the outputs from the sample writing address generator circuit 501, the data reading address generator circuit 503 and the second selector 507 and selectively outputting the same at an address output terminal 505.

Figure 12:
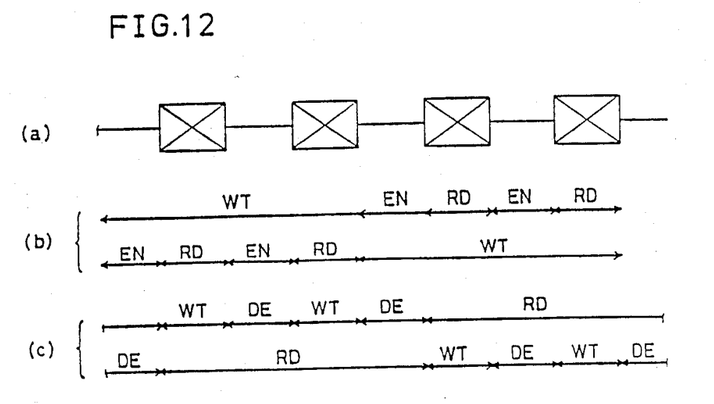
FIG. 12, consisting of (a)–(c), is a timing chart showing operation of the memory circuits as shown in FIG. 10.

FIG. 12 is a timing chart showing operation of the memory circuits as shown in FIG. 10. In FIG. 12, the rotary head-type PCM magnetic recorder/reproducer performs two-head recording/reproducing operation by 90° tape winding, and hence signal recording/reproducing intervals of 90° and pause intervals of 90° alternately appear in the recorded/reproduced waveforms as shown in FIG. 12(a). In other words, a signal recording/reproducing interval of 90° corresponds to recording/reproducing operation in one scanning interval. Within signals for two scanning intervals sampled in a writing interval WT to the memory circuit 4 as shown in FIG. 12(b), signals for one scanning interval to be read in a reading interval RD for subsequent reading from the memory circuit 4 are encoded in an encoding interval EN to be read in the reading interval RD. Then the signals for the remaining scanning interval are encoded in the subsequent encoding interval EN, to be read in the reading interval RD.

Shown in FIG. 12(c) is operation of the memory circuit 15 in reproducing operation. In the writing interval WT, the reproduced sample signals for one scanning interval are written in the memory circuit 15, and are decoded in a subsequent decoding interval DE to be written in the memory circuit 15. Then the sample signals for the remaining scanning interval are written in the memory circuit 15 in the subsequent writing interval WT, to be decoded in the subsequent decoding interval DE. The decoded samples for two scanning intervals are read in the reading interval RD. In recording operation, the samples supplied as $W_{L0}, W_{R0}, W_{L1}, \ldots$ are subjected to memory address control by the sample writing address generator circuit 501 of the memory address control circuit 51 and written in the memory circuit 15, to be in the array as shown in FIG. 12.

Figure 13:
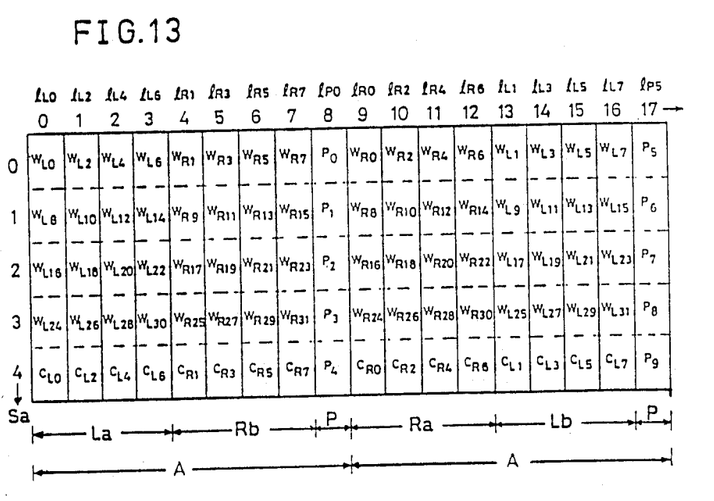
FIG. 13 is an illustration showing sample groups stored in the memory circuit as shown in FIG. 10.

FIG. 13 is an illustration showing an example of samples stored in the memory circuits as shown in FIG. 10. FIG. 13 is different from FIG. 7 in that 26 words are stored as error correction codes in addition to 32 samples of the left and right channels as data for two scanning intervals.

Operation of another embodiment of the present invention is now described with reference to FIG. 13. Encoded first are samples $1_{L0}, 1_{L2}, 1_{L4}, 1_{L6}, 1_{R1}, 1_{R3}, 1_{R5}$ and $1_{R7}$ to be recorded in the form of a matrix of 8×4. Then the second coding address generator circuit 506 generates error correction codes $P_0$ to $P_4$, and then generates error correction codes $C_{L0}, C_{L2}, C_{L4}, C_{L6}, C_{R1}, C_{R3}, C_{R5}$ and $C_{R7}$ with respect to samples read by the first coding address generator circuits 502. The encoded data of frame addresses of 0 to 8 are subsequently read in order of frame numbers by the data reading address generator circuit 503 of the memory address control circuit 51 in the unit of frames, with a frame $p_0$ of the error correction code being read after a frame number 3 to be inserted between intervals La and Rb, thereby recorded in the magnetic tape.

After reading of the samples for one scanning interval is completed, the samples for the remaining scanning interval are similarly encoded to be recorded in the adjacent scanning interval. Although continuous samples in the respective groups are thus distributed in two scanning intervals, the error correction codes are completed with respect to data for one scanning interval to be recorded in the magnetic tape, and are not extended over two scanning intervals.

In reproducing operation, the data are written in the memory circuit 15 in the unit of frames contrary to the recording operation, and are corrected by the error correction codes to be subsequently read as $W_{L0}$, $W_{R0}$, $W_{L1}$, .... The error correction codes are completed in one scanning interval as hereinabove described, and hence the samples can be decoded upon reading of the data for one scanning interval. This operation is identical to that hereinabove described with reference to FIG. 12, and since data for two scanning intervals are gathered in codes extended over two scanning intervals, the data must be decoded with respect to two scanning intervals in the subsequent decoding interval of 90°. However, the data are decoded per scanning interval in the present embodiment, and hence the clock rate required for encoding and decoding of the data is not increased by data interleaving for two scanning intervals.

Figure 14:
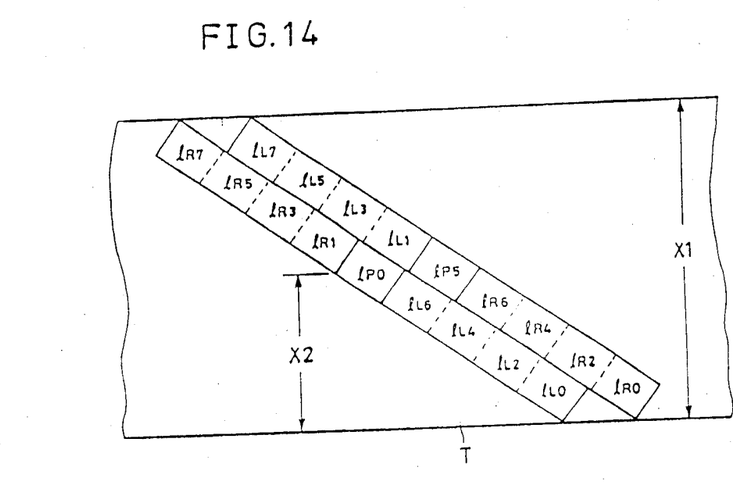
FIG. 14 illustrates a magnetization pattern showing frame array recorded by the sample groups as shown in FIG. 13.

FIG. 14 illustrates the magnetization pattern recorded on the magnetic tape by the memory circuit structure as shown in FIG. 13. In FIG. 14, symbol $X_1$ indicates the width of the magnetic tape and symbol $X_2$ indicates the width of the burst error capable of correction by mean value interpolation. In the example as shown in FIG. 14, reading addresses in recording operation are so controlled that frames $1_{P0}$ and $1_{P5}$ of error correction codes are located in the middle of one scanning interval, whereas the frames $1_{P0}$ and $1_{P5}$ may be located in any position of the scanning interval.

As hereinabove described, no continuous sample errors are caused in the magnetization pattern as shown in FIG. 14 even if the signals are interrupted for one scanning interval and a burst error is caused in the tape travelling direction in half the tape width from the edge of the magnetic tape, whereby mean value interpolation is enabled.

Figure 15:
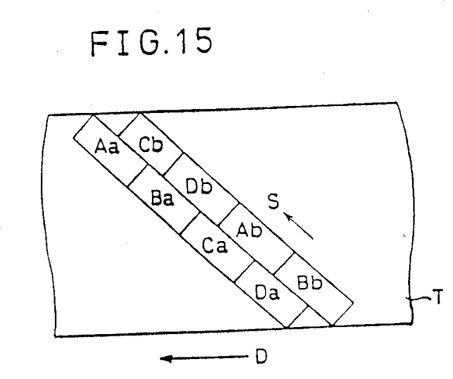
FIG. 15 is an illustration showing a magnetization pattern according to still another embodiment of the present invention.

FIG. 15 illustrates a magnetization pattern according to still another embodiment of the present invention. The magnetization pattern as shown in FIG. 15 is applied to four channels A, B, C and D. Also in the case of four channels, no continuous sample errors are caused in the respective channels even if the signals are interrupted for one scanning interval and a burst error is caused in the tape travelling direction in half the tape width from the edge of the magnetic tape, whereby mean value interpolation is enabled similarly to the case of two channels.

Although each of the above embodiments has been described with respect to a rotary head type PCM magnetic recorder/reproducer which processes audio signals, the present invention may, needless to say, be applied to a device for processing signals correctable by mean value interpolation such as video signals, and further to digital signal recording/reproducing systems other than the PCM system.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A magnetic recorder comprising recording means including a plurality of rotary heads (10,11) for performing helical scanning to produce a recording in the form of a plurality of tracks, the recorder further comprising signal processing means (4,5) for providing to the recording means digital signals comprising odd and even samples of at least one channel for enabling interleaved recording of said digital signals in such a way that the odd and even samples of said channel are recorded in different tracks and that sequentially occurring odd and even samples are separated in a direction defined along the length of the tracks, wherein the signal processing means (4,5) is structured for providing the digital signals of a plurality of channels in such a manner that, for each channel, the odd samples are recorded in a group in a region of one track, and the even samples are recorded in a group in a region of a different track, the region of said different track containing the even samples occupying a portion of the length of said different track which excludes a portion of said different track corresponding in location to a portion of the length of said one track occupied by the region in which the odd samples are recorded.

2. A magnetic recorder in accordance with claim 1, wherein each track has at least first and second regions, and said signal processing means (4,5) is structured for providing the digital signals in such a manner that one of the even samples and the odd samples of a first channel are recorded in a group in the first region of the first of a pair of tracks, and one of the even samples or the odd samples, respectively, of a second channel are recorded in a group in the second region of said first track, and the other of the even samples and the odd samples of said second channel are recorded in a group in the first region of a second of a pair of tracks and the other of the even samples and the odd samples of said first channel are recorded in a group in the second region of said second track.

3. A magnetic recorder in accordance with claim 2, wherein said signal processing means (4,5) is structured for recording said even samples of said first channel and said odd samples of said second channel on one of the first and second tracks and said odd samples of said first channel and said even samples of said second channel on the other of said first and second tracks.

4. A magnetic recorder in accordance with claim 2, wherein said signal processing means (4,5) is structured for recording said even samples of said first channel and said even samples of said second channel on one of said first and second tracks and for recording said odd samples of said first channel and said odd samples of said second channel on the other of said first and second tracks.

5. A magnetic recorder in accordance with any one of claims 3 and 4, wherein the signal processing means (4,5) is structured for containing all the samples of said first and second channels for a predetermined time period in said first and second tracks.

6. A magnetic recorder in accordance with claim 5, wherein each track comprises first and second sequentially occurring halves, respectively, including therein said first and second regions.

7. A magnetic recorder in accordance with claim 6, wherein said first and second tracks are adjacent tracks.

8. A magnetic recorder according to claim 7, wherein said signal processing means (4,5) comprises further means for recording said even samples and odd samples, for each channel, in alternate tracks of a magnetic tape.

9. A magnetic recorder in accordance with claim 8, wherein the respective regions of the tracks in which said odd samples and said even samples are recorded all have the same length along the respective track thereof.

10. A magnetic recorder in accordance with claim 9, wherein said recorder comprises means for recording two channels of digital signals.

11. A magnetic recorder in accordance with claim 10, including means (6) for generating a redundancy signal for error correction or error detection from the digital signals, said signal processing means (4,5) also being structured for providing the redundancy signal to the recording means for recording the same.

12. A magnetic recorder in accordance with claim 11, wherein said signal processing means is further structured for causing said generated redundancy signal to be recorded on a track including information employed for generating said redundancy signal.

13. A magnetic recorder in accordance with claim 12, wherein said signal processing means (4,5) is structured for causing at least a part of said redundancy signal to be gathered in a region substantially in the middle of the track on which it is recorded, and for causing samples to be recorded on both sides of said middle region.

14. A magnetic recorder as claimed in claim 13, further comprising means (10,11,13,14) for reproducing recorded digital signals and reproduced signal processing means (15,16) for permuting said reproduced digital signals so as to output the signals of each channel in a sequence corresponding to an order of sample numbers thereof.

15. A magnetic recorder in accordance with claim 2, including means (6) for generating a redundancy signal for error correction or error detection from the digital signals, said signal processing means (4,5) also being structured for providing the redundancy signal to the recording means for recording the same.

16. A magnetic recorder in accordance with claim 15, wherein said signal processing means is further structured for causing said generated redundancy signal to be recorded on a track including information employed for generating said redundancy signal.

17. A magnetic recorder in accordance with claim 16, wherein said signal processing means (4,5) is structured for causing at least a part of said redundancy signal to be gathered in a region substantially in the middle of the track on which it is recorded, and for causing samples to be recorded on both sides of said middle region.

18. A magnetic recorder as claimed in claim 17, further comprising means (10,11,13,14) for reproducing recorded digital signals and reproduced signal processing means (15,16) for permuting said reproduced digital signals so as to output the signals of each channel in a sequence corresponding to an order of sample numbers thereof.

19. A magnetic reproducer comprising reproducing means including a plurality of rotary heads (10,11) for performing helical scanning to reproduce a recording in the form of a plurality of tracks, each track having a plurality of regions occupying different portions along the length of the track, the reproducer further comprising signal processing means (15,16) for receiving from the reproducing means digital signals comprising odd and even samples of at least one channel for enabling reproduction of interleaved digital signals recorded in such a way that the odd and even samples of said channel are recorded in different tracks and that sequentially occurring odd and even samples are separated in a direction defined along the length of the tracks, wherein the signal processing means (15,16) is structured for reproducing the digital signals of a plurality of channels in such a manner that, for each channel, the odd samples are reproduced in a group from a region of one track and the even samples are reproduced in a group from a region of a different track, the region of said different track containing the even samples occupying a portion of the length of said different track which excludes a portion of said different track corresponding in location to a portion of the length of said one track occupied by the region in which the odd samples are recorded.

20. A magnetic reproducer in accordance with claim 19, wherein each track has at least first and second regions, and the reproduced signal processing means (15,16) is structured for reproducing one of the even samples and the odd samples of a first channel are reproduced in a group from the first region of the first of a pair of tracks, and one of the even samples or the odd samples, respectively, of a second channel are reproduced in a group from the second region of said first track, and the other of the even samples and the odd samples of said second channel are reproduced in a group from the first region of a second of a pair of tracks and the other of the even samples and the odd samples of said first channel are reproduced in a group from the second region of said second track.

21. A magnetic reproducer in accordance with claim 20, wherein said reproduced signal processing means (15,16) is structured for reproducing said even samples of said first channel and said odd samples of said second channel from one of the first and second tracks and said odd samples of said first channel and said even samples of said second channel from the other of said first and second tracks.

22. A magnetic reproducer in accordance with claim 20, wherein said reproduced signal processing means (15,16) is structured for reproducing said even samples of said first channel and said even samples of said second channel from one of said first and second tracks and for reproducing said odd samples of said first channel and said odd samples of said second channel from the other of said first and second tracks.

23. A magnetic reproducer in accordance with any one of claims 21 and 22, wherein the reproduced signal processing means (15,16) is structured for reproducing all the samples of said first and second channels for a predetermined time period from said first and second tracks.

24. A magnetic reproducer in accordance with claim 23, wherein each track comprises first and second sequentially occurring halves, respectively, including therein said first and second regions.

25. A magnetic reproducer in accordance with claim 24, wherein said first and second tracks are adjacent tracks.

26. A magnetic reproducer according to claim 25, wherein said signal processing means comprises further means for reproducing said even samples and odd samples, for each channel, from alternate tracks of a magnetic tape.

27. A magnetic reproducer in accordance with claim 26, wherein the respective regions of the respective tracks from which said odd samples and said even samples are reproduced all have the same length.

28. A magnetic reproducer in accordance with claim 27, wherein said reproducer comprises means for reproducing two channels of digital signals.

29. A magnetic reproducer in accordance with claim 28, including decoding means (17) for correcting or detecting error included in the reproduced digital signals, said reproduced digital signals comprising samples and a redundancy signal for error correction or error detection.

30. A magnetic reproducer in accordance with claim 29, wherein said decoding means (17) is structured for correcting or detecting errors in the digital signals reproduced from the same track as the redundancy signal.

31. A magnetic reproducer in accordance with claim 30, wherein said reproduced signal processing means (15,16) is structured for providing to said decoding means (17) a redundancy signal reproduced at least in part from a region substantially in the middle of the track on which it is recorded, as well as for providing to said decoding means (17) samples reproduced from both sides of said middle region.

32. A recording method for magnetically recording digital signals including odd and even samples of at least one channel by helically scanning a plurality of tracks of a recording medium, each track having a plurality of regions occupying different portions along the length of the track, for enabling interleaved recording of said digital signals in such a way that the odd and even samples of said channel are recorded in different tracks and that sequentially occurring odd and even samples are separated in a direction defined along the length of the tracks, comprising the steps of,
    for each channel, recording the odd samples in a group in a region of one track, and recording the even samples in a group in a region of a different track, the region of said different track containing the even samples occupying a portion of the length of said different track which excludes a portion of said different track corresponding in location to a portion of the length of said one track occupied by the region in which the odd samples are recorded.

33. A method in accordance with claim 32, wherein each track has at least first and second regions, and comprising the steps of recording one of the even samples and the odd samples of the first channel in a group in the first region of the first of a pair of tracks, recording one of the even samples and the odd samples of a second channel in a group in the second region of said first track, recording the other of the even samples and the odd samples of said second channel in a group in the first region of a second of the pair of tracks and recording the other of the even samples and the odd samples of said first channel in a group in the second region of said second track.

34. A method in accordance with claim 33, comprising the step of recording said even samples of said first channel and said odd samples of said second channel on one of the first and second tracks and recording said odd samples of said first channel and said even samples of said second channel on the other of said first and second tracks.

35. A method in accordance with claim 33, comprising the step of recording said even samples of said first channel and said even samples of said second channel on one of said first and second tracks and recording said odd samples of said first channel and said odd samples of said second channel on the other of said first and second tracks.

36. A method in accordance with any one of claims 34 and 35, comprising the step of respectively recording all the samples of said first and second channels for a predetermined time period in said first and second tracks.

37. A method in accordance with claim 36, wherein said first and second regions are included in the first and second halves, respectively, of each track.

38. A method in accordance with claim 37, wherein said first and second tracks are adjacent tracks.

39. A method according to claim 38, comprising the step of recording, for each channel, said even samples and said odd samples in alternate tracks of a magnetic tape.

40. A method in accordance with claim 39, wherein the respective regions of the tracks in which said odd samples and said even samples are recorded all have the same length.

41. A method in accordance with claim 40, comprising the step of recording two channels of digital signals.

42. A method in accordance with claim 41, comprising the further steps of generating, from information contained in the digital signals, a redundancy signal for error correction or error detection and recording said redundancy signal.

43. A method in accordance with claim 42, comprising the further step of recording said redundancy signal on a track including the information used for generating said redundancy signal.

44. A method in accordance with claim 43, comprising the step of recording at least a part of said redundancy signal in a middle region, substantially in the middle of a track, and recording samples on both sides of said middle region.

45. A method in accordance with claim 44, comprising the further step of reproducing and outputting the odd samples and even samples such that the samples of each channel are outputted in an order corresponding to sample numbers thereof.

46. A method in accordance with claim 33, comprising the further steps of generating, from information contained in the digital signals, a redundancy signal for error correction or error detection and recording said redundancy signal.

47. A method in accordance with claim 46, comprising the further step of recording said redundancy signal on a track including the information used for generating said redundancy signal.

48. A method in accordance with claim 47, comprising the step of recording at least a part of said redundancy signal in a middle region, substantially in the middle of a track, and recording samples on both sides of said middle region.

49. A method in accordance with claim 48, comprising the further step of reproducing and outputting the odd samples and even samples such that the samples of each channel are outputted in an order corresponding to sample numbers thereof.

50. A reproducing method for magnetically reproducing digital signals including odd and even samples of at least one channel by helically scanning a plurality of tracks of a recording medium, each track having a plurality of regions occupying different portions along the length of the track, for enabling reproduction of said digital signals interleavedly recorded in such a way that the odd and even samples of said channel are recorded in different tracks and that sequentially occurring odd and even samples are separated in a direction defined along the length of the tracks, comprising the steps of,
    for each channel, reproducing the odd samples in a group from a region of one track, and reproducing the even samples in a group from a region of a different track, the region of said different track containing the even samples occupying a portion of the length of said different track which excludes a portion of said different track corresponding in location to a portion of the length of said one track occupied by the region in which the odd samples are recorded.

51. A method in accordance with claim 50, wherein each track has at least first and second regions, and comprising the steps of reproducing one of the even samples and the odd samples of the first channel in a group from the first region of the first of a pair of tracks, reproducing one of the even samples and the odd samples of a second channel in a group from the second region of said first track, reproducing the other of the even samples and the odd samples of said second channel in a group from the first region of a second of the pair of tracks and reproducing the other of the even samples and the odd samples of said first channel in a group from the second region of said second track.

52. A method in accordance with claim 51, comprising the step of reproducing said even samples of said first channel and said odd samples of said second channel from one of the first and second tracks and reproducing said odd samples of said first channel and said even samples of said second channel from the other of said first and second tracks.

53. A method in accordance with claim 51, comprising the step of reproducing said even samples of said first channel and said even samples of said second channel from one of said first and second tracks and reproducing said odd samples of said first channel and said odd samples of said second channel from the other of said first and second tracks.

54. A method in accordance with any one of claims 52 and 53, comprising the step of respectively reproducing all the samples of said first and second channels for a predetermined time period from said first and second tracks.

55. A method in accordance with claim 54, wherein said first and second regions are included in the first and second halves, respectively, of each track.

56. A method in accordance with claim 55, wherein said first and second tracks are adjacent tracks.

57. A method according to claim 56, comprising the step of reproducing, for each channel, said even samples and said odd samples from alternate tracks of a magnetic tape.

58. A method in accordance with claim 57, wherein the respective regions of the tracks from which said odd or even samples are reproduced all have the same length.

59. A method in accordance with claim 58, comprising the step of reproducing two channels of digital signals.

60. A method in accordance with claim 59, comprising the further steps of reproducing a redundancy signal for error correction or error detection from the reproduced digital signals and correcting or detecting errors in the reproduced digital signals.

61. A method in accordance with claim 60, wherein said redundancy signal is reproduced from a track including recorded thereon information used for generating said redundancy signal.

62. A method in accordance with claim 61, comprising the step of reproducing at least a part of said redundancy signal from a middle region, substantially in the middle of a track, and reproducing samples from both sides of said middle region.

* * * * *